United States Patent [19]

Konishi

[11] Patent Number: 4,614,262

[45] Date of Patent: * Sep. 30, 1986

[54] SEPARATING CHUTE SYSTEM

[75] Inventor: Satoshi Konishi, Kusatsu, Japan

[73] Assignee: Kabushiki Kaisha Ishida Koki Seisakusho, Kyoto, Japan

[*] Notice: The portion of the term of this patent subsequent to Aug. 28, 2001 has been disclaimed.

[21] Appl. No.: 515,518

[22] Filed: Jul. 20, 1983

[30] Foreign Application Priority Data

Jul. 24, 1982 [JP] Japan ............................ 57-112266[U]

[51] Int. Cl.⁴ ...................... B65G 11/00; G01G 19/32
[52] U.S. Cl. .......................................... 193/23; 177/25
[58] Field of Search ............................. 103/23; 177/25

[56] References Cited

U.S. PATENT DOCUMENTS

| 4,398,612 | 8/1983 | Mikami et al. | 177/25 |
| 4,399,880 | 8/1983 | Konishi | 177/25 X |
| 4,467,880 | 8/1984 | Minamida et al. | 177/25 X |

FOREIGN PATENT DOCUMENTS

| 48105 | 5/1981 | Japan | 177/25 |
| 48110 | 10/1981 | Japan | 177/25 |

Primary Examiner—Jeffrey V. Nase
Assistant Examiner—L. E. Williams
Attorney, Agent, or Firm—Staas & Halsey

[57] ABSTRACT

A separating chute system providing two discharge passage routes includes an inner chute having an upper chute section in the shape of an inverted frustrum of a cone, and a lower chute section. A pair of outer chutes are shaped to cover the outer periphery of the inner chute and are disposed around the outer surface of said inner chute. A first discharge chute mounted below the lower chute section of the inner chute is inclined radially outwardly of the inner chute, and a second discharge chute mounted below the pair of outer chutes collects weighed articles passing through the outer chutes into one passage and discharges them to the outside.

6 Claims, 6 Drawing Figures

SEPARATING CHUTE SYSTEM

BACKGROUND OF THE INVENTION

This invention relates to separating chute system, namely a chute system having two discharge passage routes.

In a conventional combinatorial weighing apparatus, weight values of articles are obtained by plural weighing machines and a total weight or number of a batch or combination of articles that is equal or closest to a preset weight or a preset number within preset allowable limits is computed by combinatorial reckoning based on the aforementioned weight values. In such apparatus, the articles thus selected and discharged from the corresponding weighing machines are collected in the manner described below.

Specifically, as shown in FIG. 1, the weighing machine is made up of a plurality of weighing hoppers and weight sensors associated therewith. The weights of articles supplied into these weighing hoppers (A1), (A2), ... (An) are measured by associated weight sensors (B1), (B2), ... (Bn), and total weights of all possible combinations of articles are computed by a computer, with the number of articles of the combinations being arbitrary or predetermined. These total weights are compared with a preset target weight, whereby the weight combination that gives the predetermined weight or the value closest thereto within preset allowable limits is found for each weighing cycle. Then, only those weighing hoppers that are specified by said weight combination are opened, thereby discharging their contents into a common discharge chute C which in turn discharges the articles into a timing hopper D where they are collected.

Alternatively, the weight values found by the weight sensors (B1), (B2), ... (Bn) are divided by a unit article weight to give the number of articles contained in each weighing hopper and different combinations of article numbers are added by a computer. Thus a combination of article numbers that gives a total article number equal or closest to a preset article number is found for each weighing cycle and the articles in the article number combination thus found are discharged from the weighing hoppers and collected together.

Although higher accuracy may be realized with these combination weighing operations, there is increasing demand for a combinatorial weighing apparatus with an even higher weighing capacity. To improve weighing capacity, it is necessary not only to elevate the rate of supply and the measuring speed but also to collect the articles efficiently each time the articles are discharged after each weighing operation.

To this end, various collecting chute configurations have been devised, as shown by way of examples in FIGS. 2 through 4. The chute system shown in FIG. 2 comprises a collecting chute 3 having an inlet opening 1 and an outlet opening 2 and an intermediate shutter 4 suspended on top of a discharge outlet 2. A predetermined number of weighing hoppers A are arranged on top of the inlet opening 1 of the collecting chute 3. The articles are discharged from the weighing hoppers A on opening the hoppers A and are collected by the collecting chute 3 and supplied to a timing hopper D mounted below the collecting chute 3. The intermediate shutter 4 is raised and lowered depending on the rate of descent of the articles. Thus, articles discharged from the weighing hoppers A are separated from the articles discharged in the subsequent weighing cycle at the mid-portion of the chute 3 and are collected in the timing hopper D.

In this manner, it is possible to carry out the combinatorial weighing operation with the articles discharged from the weighing hoppers A at double the ordinary rate, because the articles discharged by the previous cycle are separated by the intermediate shutter 4 from the currently discharged articles and thus may be collected in the timing hopper D.

However, when the collecting chute 3 is constructed in this manner, it is necessary to provide a mechanism for vertically displacing the shutter in synchronism with opening and closing of the weighing hoppers A, thus complicating the construction of the apparatus. Moreover, the discharge capacity cannot be increased beyond a certain limit because of the provision of a movable device within the collecting chute 3.

In addition, since the collecting chute 3 has only one discharge opening 2, it is necessary to provide a distributing device when the combinatorial weighing apparatus is operatively linked to a twin tube packaging device. In such case, the operating capacity of the distributing device is critical for optimum performance of the packaging machine. In addition, great difficulty may be experienced when both tubes of the twin tube packaging machine, operatively linked with the combinatorial weighing apparatus, are operated simultaneously.

FIGS. 3 and 4 show an example of the conventional separate type collecting chute having a discharge passage divided into two routes. An inner chute section 5 and an outer chute section 6 of inverted frusto-conical shape are arranged to intersect each other so that upper supply openings 7 and 8 thereof are arranged concentrically with respect to each other and the lower discharge openings 9 and 10 are arranged in a side-by-side relation. The narrow discharge passage defined between the outer chute 6 and the inner chute 5 is cut out partially for providing an independent dual discharge passage.

In operation, weighed articles are injected into the outer chute 6 and the inner chute 5 from a predetermined number of the weighing hoppers B each having a dual discharge passage and being mounted around the upper rim of the supply openings 7, 8 of the inner and outer chutes. The weighed articles are collected separately by these chutes which in turn discharge them separately into discharge hoppers.

With this system, the configuration of the chutes 5 and 6 is necessarily complicated. Moreover, it is not possible to discharge the articles from all of the weighing hoppers B into either of the inner and outer chutes 5 and 6, resulting in a limitation upon the combinatorial computations. In addition, great difficulty may be experienced in terms of accuracy and function when the combinatorial weighing apparatus is to be operatively linked with a single tube high-speed packaging machine or a twin tube alternating-type packaging machine.

It may be contemplated to have the overall periphery of the inner chute 5 covered by the outer chute 6 so that weighed articles may be discharged from the outer chute 6 into any of the inner or outer chutes 5 and 6. However, in this case, a difference may arise in the discharge capacity of the inner and outer chutes 5, 6 because the angle of the inclined surface of the inner chute 5 is markedly different from that of the outer chute 6, which in turn gives rise to a differnce in the angle of different portions of the same chute. In addition, a narrow discharge passage is defined in the intersecting portion between the outer chute 6 and the inner chute 5, resulting in a considerable difference in the discharge capacity of the inner and outer chutes 5, 6, and a difference in the weighing hopper discharge position even with one and the same chute.

SUMMARY OF THE INVENTION

In view of these deficiencies of the conventional devices, it is an object of the present invention to provide a separating chute system according to which an outer chute is divided into two portions and the thus divided outer chute is adapted to cover the overall outer surface of an inner chute for equalizing the discharge capacity of the inner and outer chutes.

It is a further object of the present invention to provide a separating chute system in which no limitations are imposed on the arrangement of the weighing hoppers, so that the articles can be discharged from any of these weighing hoppers into any of the inner or outer chutes to remove the limitations on combinatorial computations, which chute system can be operatively linked with a single-tube high-speed packaging machine or a twin-tube alternating-type packaging machine.

It is a further object of the present invention to provide a separating chute system which is free from any interiorly provided moving parts and which enables a considerable discharge capacity to be realized despite its simple structure.

The separating chute system according to the present invention comprises an inner chute consisting of an upper chute section in the shape of a frustrum of a cone, and a lower chute section, a pair of outer chutes shaped to cover the outer periphery of the inner chute and disposed around the outer surface of the inner chute, a first discharge chute mounted below the lower chute section and inclined radially outwardly of the inner chute, and a second discharge chute mounted below the pair of outer chutes and by which the weighed articles passing through the outer chutes may be collected into one common passage and discharged to the outside of the chute system.

DESCRIPTION OF A PREFERRED EMBODIMENT

Figure 1:
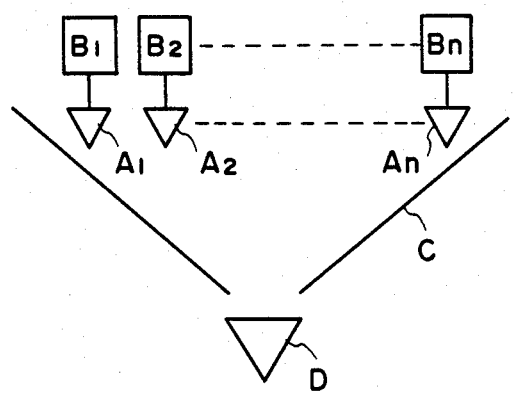
FIG. 1 is a schematic view showing the article collecting mechanism of a combinatorial weighing apparatus.
Figure 2:
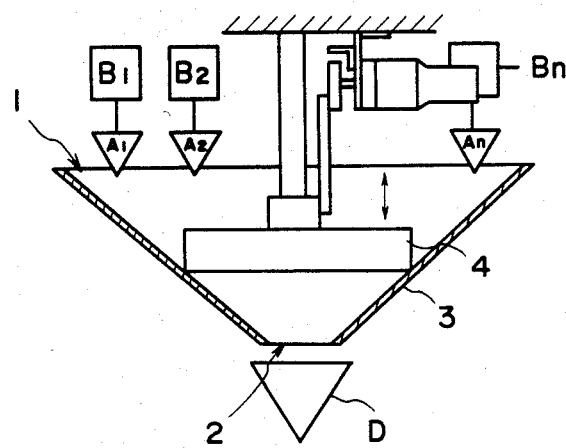
FIGS. 2 through 4 are schematic views showing conventional chutes employed in a combinatorial weighing apparatus.
Figure 3:
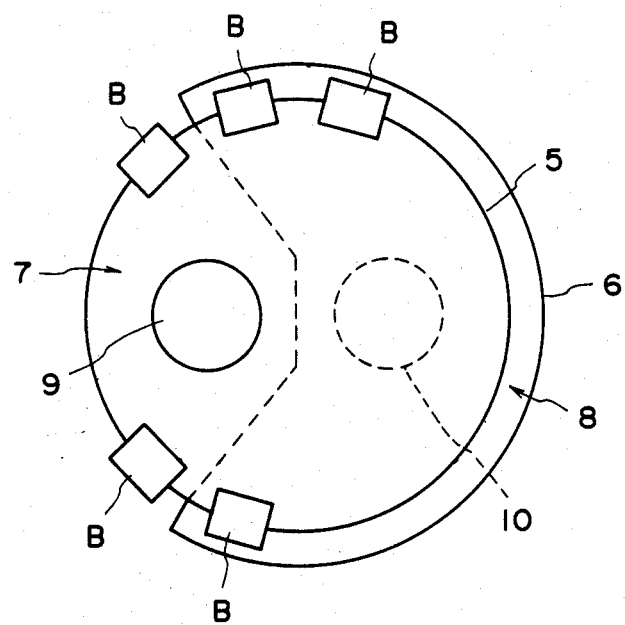
Figure 4:
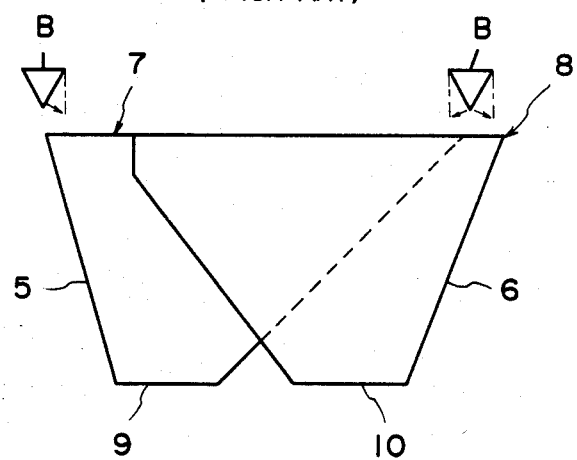
Figure 5:
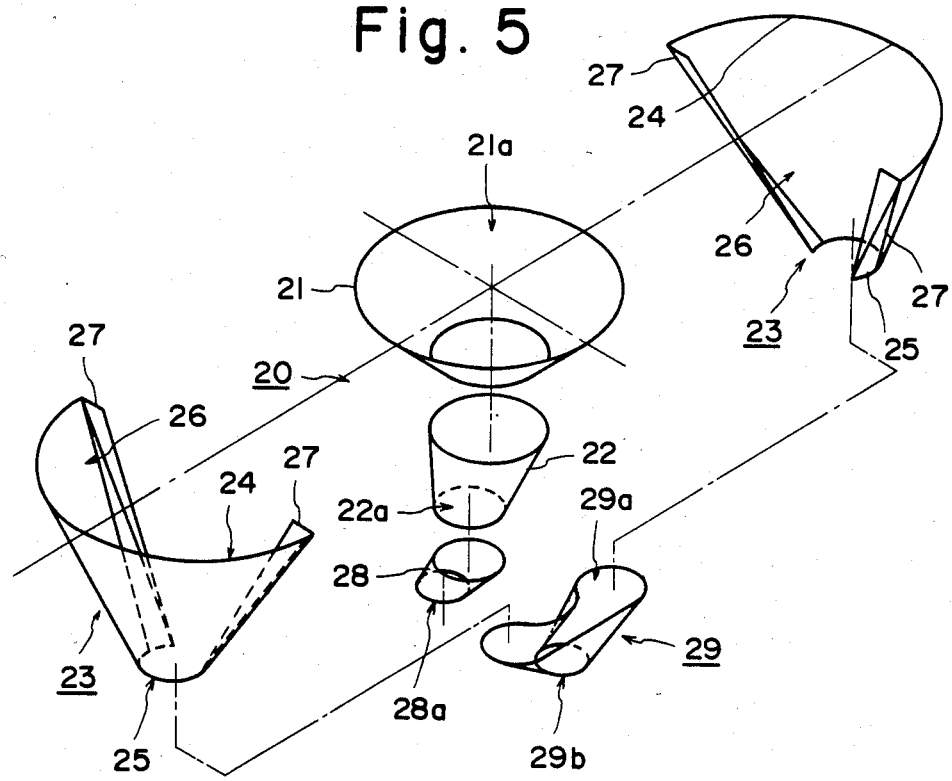
FIG. 5 is an exploded perspective view showing a chute system of the present invention.
Figure 6:
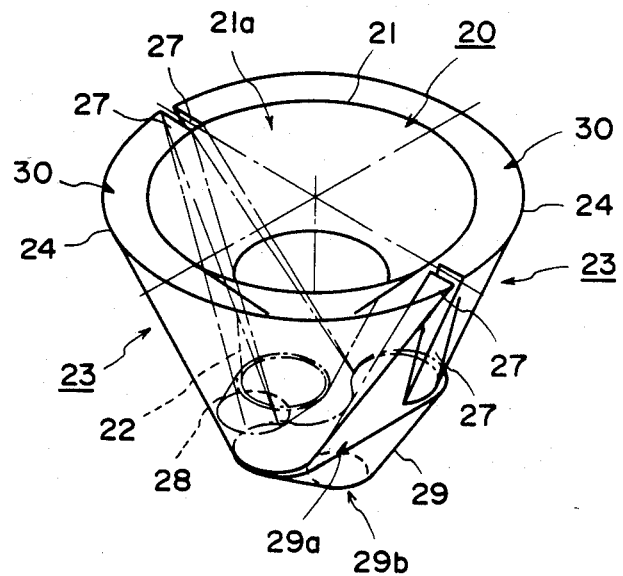
FIG. 6 is a perspective view showing the chute system of FIG. 5 in the assembled state.

FIGS. 5 and 6 illustrate a separating chute according to the present invention. In the drawings, numeral 20 designates an inner chute made up of an upper chute section 21 and a lower chute section 22 which is of lesser diameter than the upper chute section 21. The center of a lower opening 22a of the lower chute section 22 is offset outwardly from the center of an upper opening 21a of the upper chute section 21. The numerals 23 designate a pair of outer chutes fitted to the outer periphery of the inner chute 20 comprising the upper and lower chute sections 21 and 22. Each such outer chute 23 has an arcuate inclined surface 26 delimited by a semicircular upper rim 24, a substantially C-shaped lower rim 25 of lesser diameter than said upper rim, and upstanding straight side edges formed with inwardly directed flaps 27. The arrangement is such that, when the pair of outer chutes 23 are fitted around the outer periphery of the inner chute 20, the upper edges of the flaps 27 formed on both lateral edges of the outer chutes 23 are contacted by the outer periphery of the upper chute section 21, and the lower edges 25 of the substantially C-shaped outer chutes 23 are disposed on both sides of the lower chute section 22 of the chute. Numeral 28 designates a first discharge chute by means of which the weighed articles injected into the inner chute 20 are discharged to the outside of the chute system. The center of a lower opening 28a of the first discharge chute 28 is offset from the center of the upper opening 21a of the upper chute section 21 further outwardly than the center of the lower opening 22a of the lower chute section 22. Numeral 29 designates a second discharge chute which is mounted below the pair of outer chutes 23 and by which, the weighed articles injected into the pair of outer chutes 23 are collected together and discharged to the outside. The second discharge chute 29 has an upper opening 29a in the shape of an ellipse or an ellipse having a constricted mid-zone for mating with the lower rims 25 of the outer chutes 23, and a lower opening 29b disposed below the center of the upper opening 29a for uniformly collecting and discharging the weighed articles discharged from the pair of outer chutes 23. The weighed articles injected into the upper chute section 21 of the inner chute 20 are guided through the upper and lower chute sections 21 and 22 to be discharged to the outside through the first discharge chute 28 communicating with the lower chute section 22. The weighed articles injected into the pair of outer chutes 23 through interstices 30 defined between the upper chute section 21 of the inner chute 20 and the pair of outer chutes 23 are collected together by the second discharge chute 29 disposed below the pair of outer chutes 23 to be discharged to the outside through the lower opening 29a of the second discharge chute 29.

In the foregoing embodiment, each chute has an outer profile of frusto-conical shape. However, if so required under particular sheet metal working conditions, an outer chute profile of a polyhedral pyramid similar to the frustrum of a cone and having multiple fold or crease lines formed on each facet (so-called diamond cuts) may be adopted without impairing the function of the chute system.

According to the present invention, the collecting chute employed in the combinatorial weighing apparatus is made up of the inner chute 20 and a pair of outer chutes 23 placed around the periphery of the inner chute 20, so that the articles injected into the outer chutes 23 are collected together by the second discharge chute 29 mounted below the chutes 23. In this manner, the outer chutes 23 can be mounted without undue mechanical constraint on the overall periphery of the inner chute 20, while any narrow zone that may otherwise be formed between the inner chute 20 and the outer chutes 23 can be eliminated. Further the discharge capacity of the inner chute 20 can be made substantially equal to that of the outer chutes 23.

Thus a predetermined number of weighing hoppers having two discharge routes are mounted above the rim of the chutes, and batches of articles resulting from combinatorial weighing are introduced separately from these weighing hoppers into the outer chutes 23 and the inner chutes 20. These different batches of weighed articles are collected separately by these chutes 20 and 23 and are discharged separately. In this manner, the articles discharged from the weighing hoppers may be discharged into any of the inner or outer chutes so that the chute system can be operatively linked not only to twin-tube dual interlocking type packaging devices but to twin tube alternating-type packaging devices, or single tube high-speed packaging devices, thus eliminating the problems so far encountered with conventional chute devices having dual discharge routes or built-in shutters, namely the difficulties involved in achieving operative linkage because of the discharge capacity.

Since the upper openings of the inner and outer chutes are arranged concentrically, i.e., having a common center independent of the shape of the opening of the chute, with respect to each other, no limitation is imposed on the arrangement of the weighing hoppers and the weighed articles can be discharged into any of the inner or outer chutes, thus removing limitations on the combinatorial computations. In addition, since there is no movable member such as shutter within the chute, the discharge capacity may be improved in spite of a simplified structure.

What is claimed is:

1. A separating chute system having two discharge passage routes, comprising:
   (a) an inner chute including an upper chute section having the shape of an inverted frustrum of a cone defining a first solid angle, and a lower chute section removably attached to said upper chute section and having the shape of an inverted frustrum of a cone defining a second solid angle, the second solid angle being smaller than the first solid angle;
   (b) a pair of outer chutes shaped to cover the outer periphery of said inner chute, and arranged about the outer periphery of said inner chute, the outer chutes being removably attached to each other;
   (c) a first discharge chute placed below said lower chute of said inner chute and inclined radially outwardly of said inner chute; and
   (d) a second discharge chute mounted below said pair of outer chutes so that the weighed articles passing through said outer chutes are collected together into one passage and discharged to the outside.

2. A separating chute system as claimed in claim 1, whrein said outer chutes have a lower outer rim and wherein said second discharge chute includes:
   (a) an upper opening shaped to fit said lower outer rim of said pair of outer chutes; and
   (b) a lower opening disposed below the center of said upper opening so that the weighed articles discharged from said pair of outer chutes may be collected and discharged uniformly.

3. A separating chute system as claimed in claim 2, wherein said upper opening of said second discharge chute is substantially elliptical and has a constricted mid-portion.

4. A separating chute system as claimed in claim 2, wherein said upper opening of said second discharge chute is substantially elliptical.

5. A separating chute system having a dual passage route, comprising:
   (a) an inner chute, including an upper chute having the shape of an inverted frustrum of a polyhedral pyramid, and a lower chute;
   (b) a pair of outer chutes shaped to cover the peripheral surface of said inner chute and placed around said peripheral surface of said inner chute;
   (c) a first discharge chute disposed below said lower chute of said inner chute and inclined radially outwardly of said inner chute; and
   (d) a second discharge chute mounted below said pair of outer chutes so that the weighed articles passing through said outer chutes are collected together into one route and discharged to the outside.

6. A chute system, comprising:
   an inner chute, including an upper chute section defining a first solid angle and having a first opening, and a lower chute section, removably attached to said upper chute section, defining a second solid angle and having a second opening, said second opening of said lower chute section being smaller than and off-center with respect to said first opening of said upper chute section, and the second solid angle being smaller than the first solid angel;
   a pair of outer chute segments, removably attached to each other, forming an outer chute having upper and lower openings, said upper opening being larger than and concentric with said first opening of said inner chute and said lower opening of said outer chute and said second opening of said lower chute section of said inner chute being adjacent and non-intersecting;
   a first discharge chute mounted below and connected with said second opening of said lower chute section; and
   a second discharge chute mounted below and connected with said lower opening of said outer chute.

* * * * *

UNITED STATES PATENT AND TRADEMARK OFFICE
CERTIFICATE OF CORRECTION

PATENT NO. : 4,614,262

DATED : September 30, 1986

INVENTOR(S) : Konishi

It is certified that error appears in the above-identified patent and that said Letters Patent is hereby corrected as shown below:

Col. 5, line 51, "whrein" should be --wherein--.

Col. 6, line 38, "angel" should be --angle--;

Signed and Sealed this

Tenth Day of February, 1987

Attest:

DONALD J. QUIGG

*Attesting Officer*  *Commissioner of Patents and Trademarks*